(12) United States Patent
Sato

(10) Patent No.: US 10,360,415 B2
(45) Date of Patent: Jul. 23, 2019

(54) SEMICONDUCTOR MEMORY HAVING RADIO COMMUNICATION FUNCTION AND APPLICATION CONTROL METHOD

(71) Applicant: FUJITSU SEMICONDUCTOR LIMITED, Yokohama-shi, Kanagawa (JP)

(72) Inventor: Takahiko Sato, Bunkyo (JP)

(73) Assignee: FUJITSU SEMICONDUCTOR LIMITED, Yokohama (JP)

( * ) Notice: Subject to any disclaimer, the term of this patent is extended or adjusted under 35 U.S.C. 154(b) by 0 days.

(21) Appl. No.: 16/036,230

(22) Filed: Jul. 16, 2018

(65) Prior Publication Data

US 2019/0034671 A1 Jan. 31, 2019

(30) Foreign Application Priority Data

Jul. 28, 2017 (JP) .................................. 2017-146566

(51) Int. Cl.
  *G06K 7/00* (2006.01)
  *G06K 7/10* (2006.01)
  (Continued)

(52) U.S. Cl.
  CPC ....... *G06K 7/0008* (2013.01); *G06K 7/10316* (2013.01); *G06K 19/0723* (2013.01);
  (Continued)

(58) Field of Classification Search
  CPC .......... G06K 7/10366; G06K 7/10009; G06K 19/0723; G06K 7/10316; G06K 7/10356;
  (Continued)

(56) References Cited

U.S. PATENT DOCUMENTS 8,804,959 B2    8/2014 Negishi et al.
9,965,934 B2 *  5/2018 Siminoff .............. G08B 13/196
(Continued)

FOREIGN PATENT DOCUMENTS

JP    2008-135000 A    6/2008
JP    2009-70054 A     4/2009
(Continued)

*Primary Examiner* — Mark S Blouin
(74) *Attorney, Agent, or Firm* — Westerman, Hattori, Daniels & Adrian, LLP

(57) ABSTRACT

A radio communication processor receives data to which identification information is assigned and transmits a response signal indicative of whether or not application processing based on the data is normally performed. An application controller controls the application processing on the basis of the data and detects whether or not the application processing is normally performed. A controller detects on the basis of the identification information that the same data are received in succession due to retransmission, nullifies, when the application controller detects that the application processing based on the data received earlier is normally performed, control of the application processing based on the data received later to be performed by the application controller and instructs the radio communication processor to transmit the response signal which indicates that the application processing is normally performed.

14 Claims, 10 Drawing Sheets

(51) Int. Cl.
 *H04B 5/00* (2006.01)
 *H04L 1/18* (2006.01)
 *H04W 4/80* (2018.01)
 *G06K 19/07* (2006.01)

(52) U.S. Cl.
 CPC ............ *H04B 5/0062* (2013.01); *H04L 1/18* (2013.01); *H04W 4/80* (2018.02)

(58) Field of Classification Search
 CPC ............ G06K 7/0008; G06K 19/0717; G06K 7/10257; G06K 2017/0045; G06K 7/10128
 USPC ....................................................... 340/10.1
 See application file for complete search history.

(56) References Cited

U.S. PATENT DOCUMENTS

| | | | | |
|---|---|---|---|---|
| 10,103,749 | B2* | 10/2018 | Park | G06F 11/10 |
| 10,181,295 | B2* | 1/2019 | Hirakata | G09G 3/3406 |
| 10,186,106 | B2* | 1/2019 | Hughes | G07F 17/3213 |
| 10,200,063 | B2* | 2/2019 | Ha | G06F 11/1012 |

FOREIGN PATENT DOCUMENTS

| | | |
|---|---|---|
| JP | 2010-286935 A | 12/2010 |
| JP | 2011-258070 A | 12/2011 |

\* cited by examiner

PACKET DATWR

| BIT NUMBER | OpeCode | MemBank | WordPtr | WordCount | DataWrite | Handle | CRC |
|---|---|---|---|---|---|---|---|
| | 8 | 2 | EBV | 8 | (WORD COUNT x 16) | 16 | 16 |
| CONTENTS | 11000111 | BANK ADDRESS | STARTING ADDRESS | WRITE WORD COUNT | WRITE DATA | HANDLE VALUE | CRC VALUE |

| SEQNUM | APPDIPTR | APPLEN | APPDAT |
|---|---|---|---|

FIG. 7

SEMICONDUCTOR MEMORY HAVING RADIO COMMUNICATION FUNCTION AND APPLICATION CONTROL METHOD

CROSS-REFERENCE TO RELATED APPLICATION

This application is based upon and claims the benefit of priority of the prior Japanese Patent Application No. 2017-146566, filed on Jul. 28, 2017, the entire contents of which are incorporated herein by reference.

FIELD

The embodiments discussed herein are related to a semiconductor memory having a radio communication function and an application control method.

BACKGROUND

In recent years semiconductor memories, such as radio frequency (RF) tags (which may be referred to as radio frequency identifiers (RFIDs)), having a radio communication function have increased in number. RF tags which perform radio communication in an ultra-high frequency (UHF) band are being standardized by EPCglobal (registered trademark) and are used for commodity tags and the like. Furthermore, RF tags to which an image display device, such as electronic paper, is connected and RF tags to which a sensor is connected are also known.

An RF tag performs radio communication with a reader-writer. If the RF tag receives data for performing each application, then the RF returns to the reader-writer a response signal to the effect that it received the data. If the reader-writer receives the response signal, then the reader-writer transmits the next data. If the reader-writer does not receive the response signal in a determined period, then the reader-writer determines that a communication error has occurred, and transmits the same data again. Reply strength tends to weaken especially with a passive type RF tag which is not equipped with a battery and which operates on the basis of power supplied from a reader-writer. As a result, a communication error tends to occur.

Japanese Laid-open Patent Publication No. 2011-258070
Japanese Laid-open Patent Publication No. 2008-135000
Japanese Laid-open Patent Publication No. 2010-286935
Japanese Laid-open Patent Publication No. 2009-70054

However, though application processing based on data received the last time is normally performed in a semiconductor memory having a radio communication function, the same data may be received again. In that case, the same processing is repeated and abnormal operation may occur.

With an RF tag which receives image data from a reader-writer and which causes a display device to display the image data, for example, the following problem may arise if the same image data are processed more than one time. For example, the length of a displayed image may increase. Furthermore, with an RF tag which receives a sensor value acquisition command from a reader-writer, there is a case where the last command is normally processed and where the command is processed again. In that case, a plurality of values may be stored in a memory as a sensor value at a given time.

SUMMARY

According to an aspect, there is provided a semiconductor memory having a radio communication function, the semiconductor memory including a radio communication processor that receives first data to which identification information is assigned and that transmits a response signal indicative of whether or not application processing based on the first data is normally performed, a first controller that controls the application processing based on the first data and that detects whether or not the application processing is normally performed, and a second controller that detects, based on the identification information whether or not the radio communication processor receives the first data in succession due to retransmission caused by a communication error, and that nullifies, when the radio communication processor receives the first data in succession and the first controller detects that the application processing based on the first data received earlier is normally performed, control of the application processing based on the first data received later to be performed by the first controller and instructs the radio communication processor to transmit the response signal which indicates that the application processing is normally performed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of an assembled packet;

DESCRIPTION OF EMBODIMENTS

Embodiments will now be described with reference to the accompanying drawings.

First Embodiment

Figure 1:
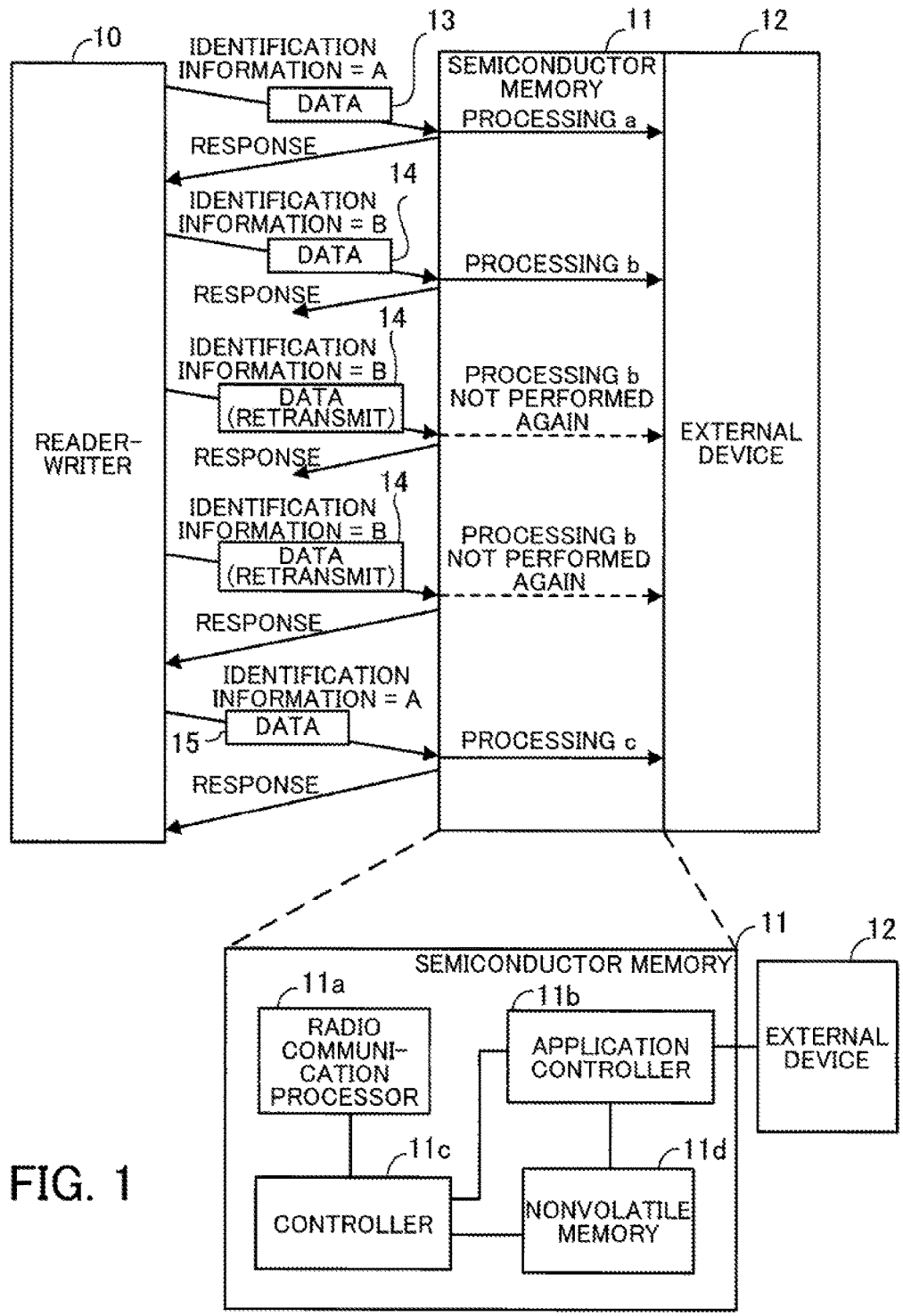
FIG. 1 illustrates an example of a radio communication system including a semiconductor memory according to a first embodiment.

FIG. 1 illustrates an example of a radio communication system including a semiconductor memory according to a first embodiment.

A semiconductor memory 11 is an RF tag which performs radio communication with, for example, a reader-writer (not illustrated). An RFID standard, such as EPCglobal ISO (International Organization for Standardization)/IEC (International Electrotechnical Commission) 18000-6 Type-C, is applicable in the UHF band. Furthermore, an RFID standard, such as ISO/IEC 15693, is applicable in a high frequency (HF) band.

The semiconductor memory 11 includes a radio communication processor 11a, an application controller 11b, a controller 11c, and a nonvolatile memory 11d.

The radio communication processor 11a transmits data to and receives data from a reader-writer 10 via an antenna (not illustrated). As illustrated in FIG. 1, the radio communication processor 11a receives data 13, 14, and 15 to which identification information is assigned. Furthermore, the radio communication processor 11a transmits a response signal (represented by "RESPONSE" in FIG. 1) indicative of whether or not application processing based on the data 13, 14, or 15 is normally performed.

In the example of FIG. 1, "A" is assigned as the identification information to the data 13 and "B" is assigned as the identification information to the data 14. Furthermore, "A" is assigned again as the identification information to the data 15 transmitted next to the data 14. That is to say, "A" and "B" are repeated as the identification information in the order of the transmission of continuous data to the reader-writer 10. Accordingly, "A" and "B" may be 1-bit values, that is to say, 0 and 1. However, unique identification information may be assigned to different data.

The application processing is a display of image data using a display device (such as electronic paper) as an external device 12 connected to the semiconductor memory 11, acquisition of a sensor value (such as temperature or humidity) using a sensor as the external device 12, or the like.

If the semiconductor memory 11 is a passive type RF tag, then the radio communication processor 11a generates from a radio signal including the above data an internal voltage for causing the application controller lib, the controller 11c, or the like to operate.

The application controller 11b exercises control of the above application processing and detects whether or not the application processing is normally performed. In FIG. 1, the application processing based on the data 13 is represented as processing a, the application processing based on the data 14 is represented as processing b, and the application processing based on the data 15 is represented as processing c.

On the basis of the identification information assigned to the data 13, 14, and 15, the controller 11c detects whether or not the radio communication processor 11a receives the same data in succession due to retransmission caused by a communication error. If the radio communication processor 11a receives in succession data to which the same identification information is assigned, then the controller 11c detects that the radio communication processor 11a receives the same data in succession. In the example of FIG. 1, for example, a response signal does not reach the reader-writer 10 because of a communication error and the data 14 to which "B" is assigned as the identification information are retransmitted. As a result, the radio communication processor 11a receives the data 14 in succession.

If the radio communication processor 11a receives the same data in succession and the application controller 11b detects that application processing based on the data received earlier is normally performed, then the controller 11c performs the following process. The controller 11c nullifies control of application processing based on the data received later to be performed by the application controller 11b and instructs the radio communication processor 11a to transmit a response signal which indicates that the application processing is normally performed.

As illustrated in FIG. 1, for example, if the same data 14 are retransmitted after the processing b based on the data 14 is normally performed, the processing b is not performed again by the operation of the above controller 11c. However, the response signal is transmitted. In the example of FIG. 1, the response signal does not reach the reader-writer 10 because of the communication error and the data 14 to which "B" is assigned as the identification information are retransmitted. As a result, the radio communication processor 11a receives the data 14 in succession. In this case, the processing b is not performed again by the operation of the above controller 11c and a response signal is transmitted. In the example of FIG. 1, this response signal reaches the reader-writer 10. Accordingly, the reader-writer 10 newly transmits the data 15. The semiconductor memory 11 which receives the data 15 performs the processing c and returns a response signal.

The nonvolatile memory 11d is a flash memory, an electrically erasable programmable read-only memory (EEPROM), a ferroelectric random access memory (FeRAM), a magnetoresistive random access memory (MRAM), or the like. The nonvolatile memory 11d stores data received by the radio communication processor 11a, data acquired from the external device 12, and the like.

The flow of an application control method adopted by the semiconductor memory 11 according to the first embodiment will now be described.

Figure 2:
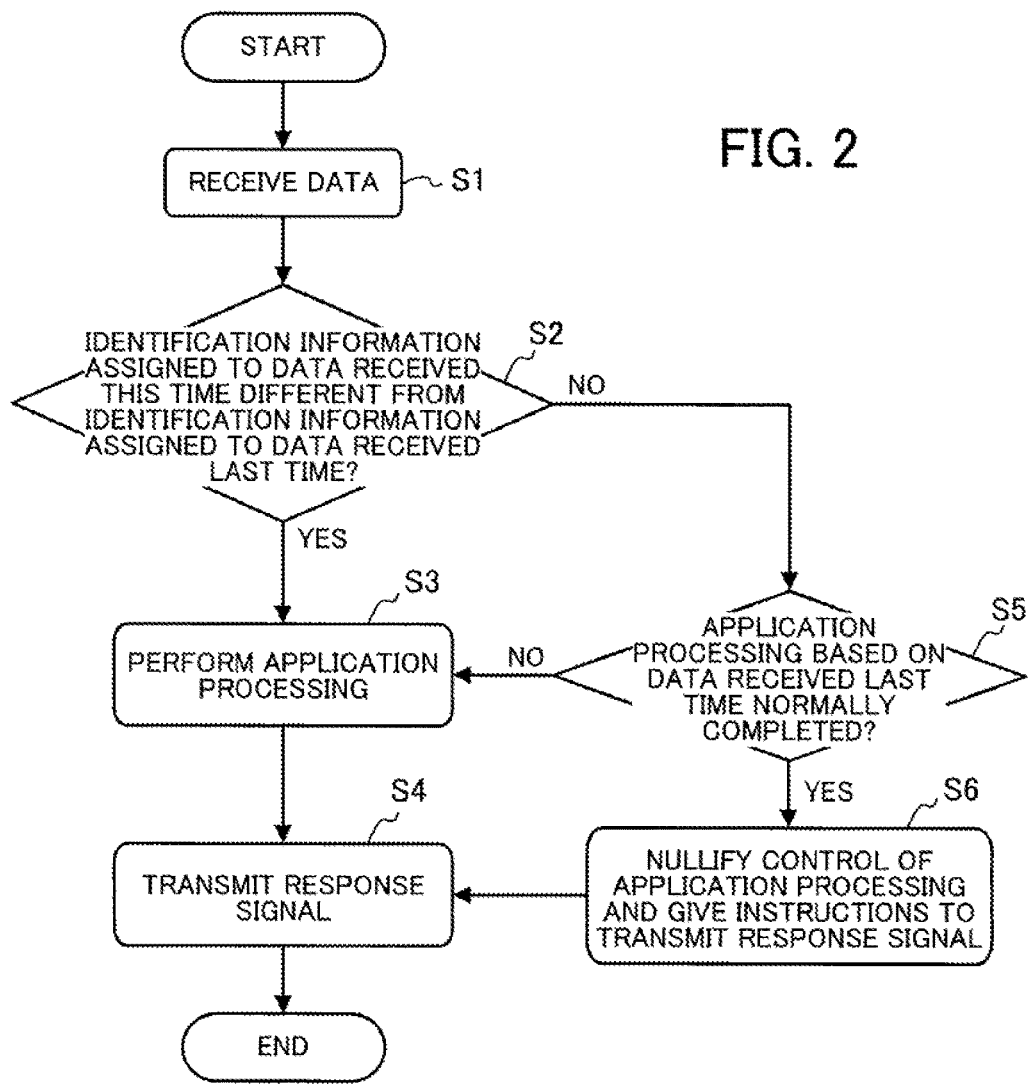
FIG. 2 is a flow chart illustrative of the flow of an example of an application control method.

FIG. 2 is a flow chart illustrative of the flow of an example of an application control method.

When the radio communication processor 11a receives data (step S1), the controller 11c determines whether or not identification information assigned to the data received this time is different from identification information assigned to data received the last time (step S2). That is to say, the controller 11c detects whether or not the radio communication processor 11a receives the same data in succession.

If identification information assigned to the data received this time is different from identification information assigned to the data received the last time (YES in step S2), then the application controller 11b exercises control of application processing on the basis of the data received this time. As a result, the application processing is performed (step S3).

After that, the radio communication processor 11a transmits to the reader-writer 10 a response signal which indicates whether or not the application processing is normally performed (step S4), and ends a process.

On the other hand, if identification information assigned to the data received this time is equal to identification information assigned to the data received the last time (NO in step S2), then the controller 11c performs the following process.

On the basis of a result of detection by the application controller 11b, the controller 11c determines whether or not application processing based on the data received the last time is normally completed (step S5).

If the application processing based on the data received the last time is not normally completed (NO in step S5), then step S3 is performed. If the application processing based on the data received the last time is normally completed (YES in step S5), then the controller 11c nullifies control of application processing exercised by the application controller 11b on the basis of the data received this time. Furthermore, the controller 11c instructs the radio communication processor 11a to transmit a response signal which indicates that the application processing normally ends (step S6). As a result, step S4 is performed.

When the semiconductor memory 11 receives in succession the same data that is normally processed, the above method prevents data received later from being processed again. Accordingly, the occurrence of abnormal operation is suppressed.

For example, abnormal operation whose occurrence is suppressed by the semiconductor memory according to the first embodiment and the application control method is as follows.

Figure 3:
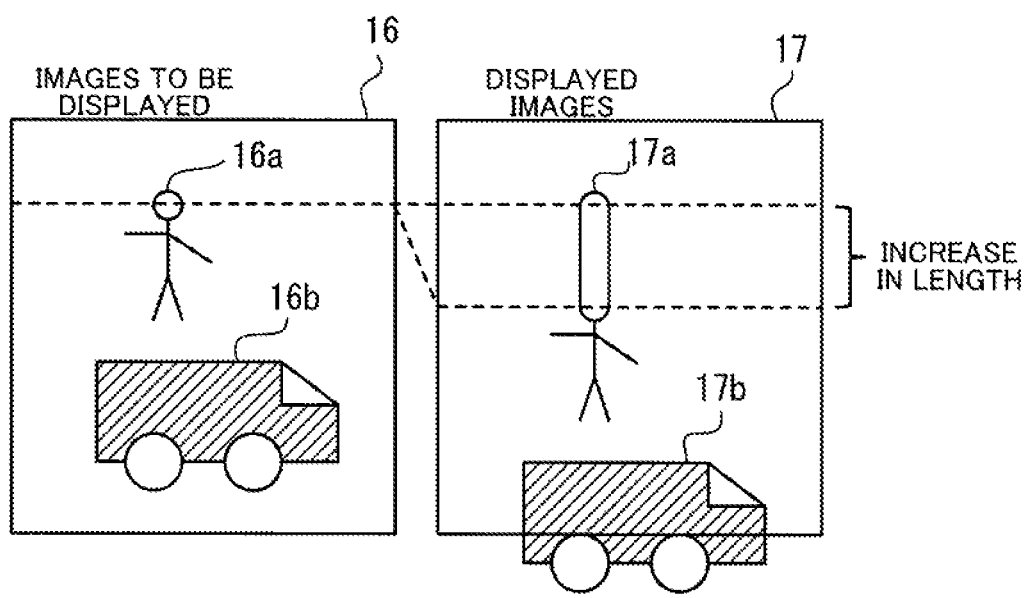
FIG. 3 illustrates an example of abnormal operation which occurs in the case of application processing being an image data display.

FIG. 3 illustrates an example of abnormal operation which occurs in the case of application processing being an image data display.

If application processing is an image data display, a display device is used as the external device 12. FIG. 3 illustrates a screen 16 including images to be displayed and a screen 17 including images displayed as a result of reprocessing in succession data normally processed.

The screen 16 includes an image 16a of a person and an image 16b of a vehicle. There is a case where only image data is received after an address of a starting point at the time of image data update is designated in a memory in the display device, and a display position of the image data is calculated from the amount of data which have been received. In that case, for example, an abnormality, such as that indicated on the screen 17, may occur. If the same image data that are normally transferred to the display device are retransmitted by the reader-writer 10 and are transferred again to the display device, there may be an increase in length. For example, the length of a face portion of an image 17a of a person increases. Furthermore, as a result of an increase in length, there is a possibility that part of an image, such as an image 17b, is not displayed on the screen 17.

Image data which are normally processed may be retransmitted by the reader-writer 10. According to the semiconductor memory 11 according to the first embodiment and the application control method, the controller 11c nullifies control of application processing based on the image data. Therefore, the application controller 11b does not transfer the same image data to the display device (external device 12) and the occurrence of the above abnormality is suppressed.

Figure 4:
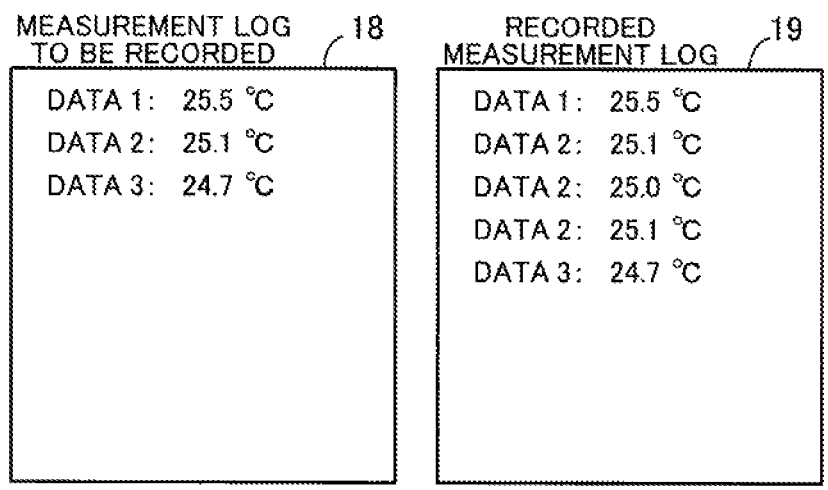
FIG. 4 illustrates an example of abnormal operation which occurs in the case of application processing being sensor value acquisition.

FIG. 4 illustrates an example of abnormal operation which occurs in the case of application processing being sensor value acquisition.

If application processing is sensor value acquisition, a sensor (such as a temperature sensor) is used as the external device 12. FIG. 4 illustrates a measurement log 18 to be recorded in the nonvolatile memory 11d and a measurement log 19 recorded as a result of reprocessing data normally processed.

In the measurement log 18, "DATA 1," "DATA 2," and "DATA 3" represent temperature acquired from the sensor on the basis of, for example, the data 13 through 15 (such as sensor value acquisition commands transmitted every determined period from the reader-writer 10) indicated in FIG. 1. For example, if the data 14 normally processed are retransmitted because of a communication error and is reprocessed, a plurality of values may be stored in the nonvolatile memory 11d as temperature at a given time. "DATA 2" in the measurement log 19 illustrated in FIG. 4 are taken as an example. As a result, the usage of the nonvolatile memory 11d exceeds an estimated amount.

Data (such as a sensor value acquisition command) which are normally processed may be retransmitted by the reader-writer 10. According to the semiconductor memory according to the first embodiment and the application control method, the controller 11c nullifies control of application processing based on the data. Therefore, the application controller 11b does not acquire a sensor value from the sensor (external device 12) and the occurrence of the above abnormality is suppressed.

Second Embodiment

Figure 5:
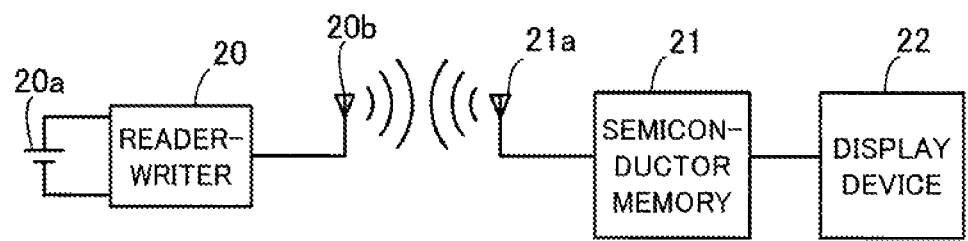
FIG. 5 illustrates an example of a radio communication system according to a second embodiment.

FIG. 5 illustrates an example of a radio communication system according to a second embodiment.

A radio communication system includes a reader-writer 20, a semiconductor memory 21, and a display device 22 as an example of the external device 12 illustrated in FIG. 1.

Power is supplied to the reader-writer 20 by a battery 20a. The reader-writer 20 transmits various commands, data, and the like to the semiconductor memory 21 and receives responses from the semiconductor memory 21, via an antenna 20b.

The semiconductor memory 21 receives radio signals including the various commands, the data, and the like and returns the responses to the reader-writer 20, via an antenna 21a. Furthermore, the semiconductor memory 21 transmits image data, various pieces of setting information, and the like to the display device 22 and receives responses from the display device 22.

The display device 22 is electronic paper or the like and displays the image data transmitted from the semiconductor memory 21.

In the example of FIG. 5, the semiconductor memory 21 or the display device 22 is not equipped with a battery. The semiconductor memory 21 generates an internal voltage from a radio signal received via the antenna 21a and uses the internal voltage for its communication, writing to or reading from a nonvolatile memory, controlling the display device 22, supplying power to the display device 22, or the like.

(Example of Reader-Writer 20)

Figure 6:
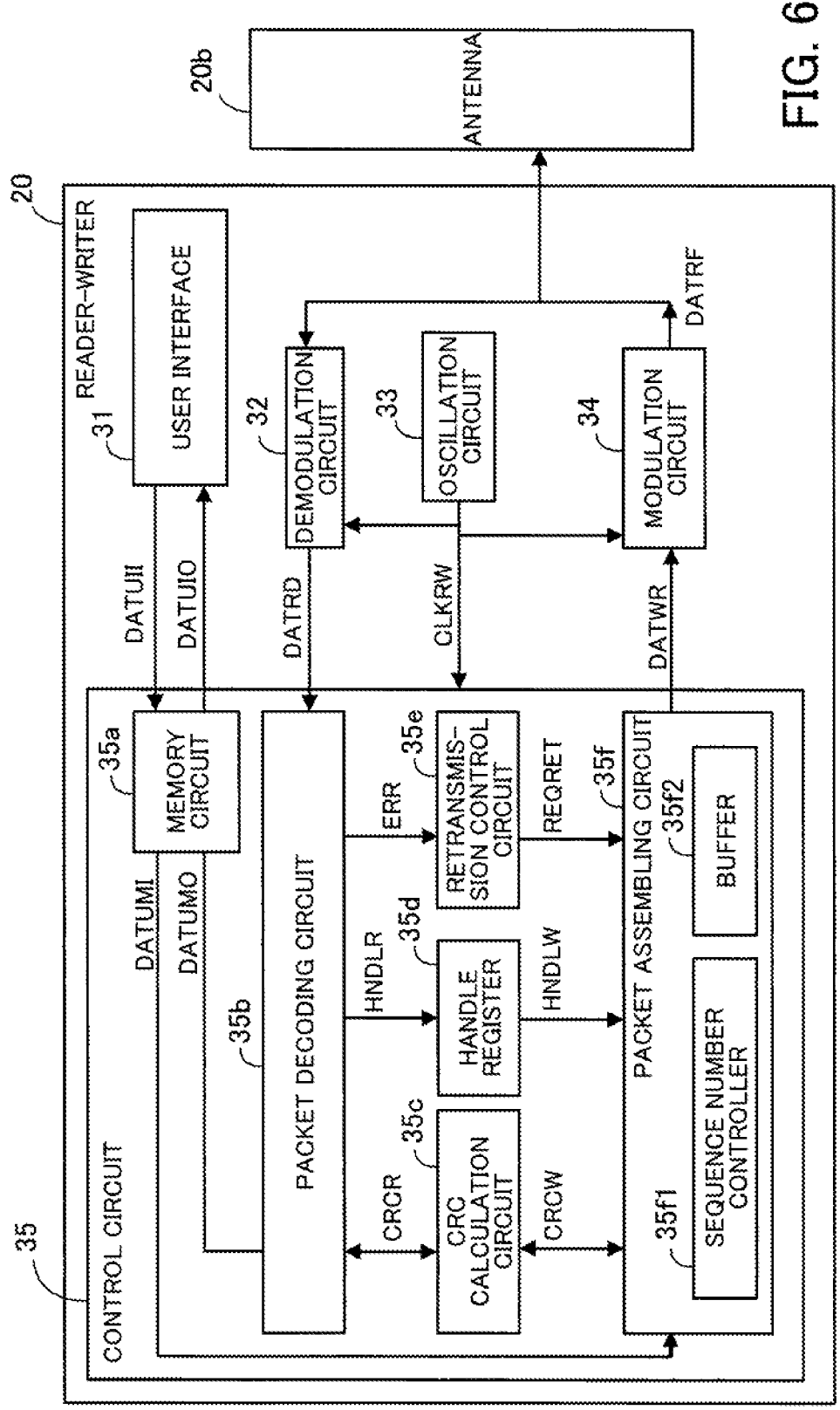
FIG. 6 illustrates an example of a reader-writer.

FIG. 6 illustrates an example of the reader-writer.

The reader-writer 20 includes a user interface 31, a demodulation circuit 32, an oscillation circuit 33, a modulation circuit 34, and a control circuit 35.

The user interface 31 is a touch panel or the like and accepts the type of a command, data, address information, and the like inputted by a user. The address information includes an address of the nonvolatile memory of the semiconductor memory 21. The user interface 31 supplies to the control circuit 35 information DATUII including the type of the command, the address information, and the data. The user interface 31 may provide the user with a packet decoding result DATUIO described later, for example, by receiving it from the control circuit 35 and displaying it.

The demodulation circuit 32 demodulates a signal received via the antenna 20b and transmits it as information DATRD to the control circuit 35.

The oscillation circuit 33 generates a clock signal CLKRW for causing the demodulation circuit 32, the modulation circuit 34, and the control circuit 35 to operate.

The modulation circuit 34 modulates a packet DATWR generated by the control circuit 35 and transmits it as a signal DATRF to the antenna 20b.

The control circuit 35 includes a memory circuit 35a, a packet decoding circuit 35b, a cyclic redundancy check (CRC) calculation circuit 35c, a handle register 35d, a retransmission control circuit 35e, and a packet assembling circuit 35f.

The memory circuit 35a temporarily stores the information DATUII or a packet decoding result DATUMO outputted by the packet decoding circuit 35b. At least part of the information DATUII is read out as information DATUMI from the memory circuit 35a and is supplied to the packet assembling circuit 35f. Furthermore, at least part of the packet decoding result DATUMO may be read out as the packet decoding result DATUIO from the memory circuit 35a and be supplied to the user interface 31.

The packet decoding circuit 35b extracts from the information DATRD information used for calculating a CRC value, transmits the information to the CRC calculation circuit 35c, and receives a CRC value CRCR from the CRC calculation circuit 35c. Furthermore, if the CRC value CRCR is different from a CRC value included in the information DATRD, then the packet decoding circuit 35b informs the retransmission control circuit 35e of an error signal ERR indicative of the occurrence of an error. In addition, for example if a command to acquire a handle value used by the reader-writer 20 for identifying the semiconductor memory 21 is transmitted, a handle value HNDLR is included in the information DATRD obtained from a response of the semiconductor memory 21 to the command. If the above error has not occurred, the packet decoding circuit 35b records in the handle register 35d the handle value HNDLR included in the information DATRD.

On the basis of information transmitted from the packet decoding circuit 35b or the packet assembling circuit 35f, the CRC calculation circuit 35c calculates the CRC value CRCR or a CRC value CRCW. Furthermore, the CRC calculation circuit 35c transmits the CRC value CRCR to the packet decoding circuit 35b and transmits the CRC value CRCW to the packet assembling circuit 35f.

The handle register 35d holds the handle value HNDLR. The handle register 35d may hold the handle values of a plurality of semiconductor memories (RF tags). Furthermore, a handle value HNDLW (if as illustrated in FIG. 5, the number of a command transmission destination is one, then the handle value HNDLW is equal to the handle value HNDLR) of semiconductor memories, which is a command transmission destination, is read out from the handle register 35d to the packet assembling circuit 35f.

When the retransmission control circuit 35e receives the error signal ERR, the retransmission control circuit 35e informs the packet assembling circuit 35f of a retransmission request REQRET.

The packet assembling circuit 35f extracts from the information DATUMI information used for calculating a CRC value, transmits the information to the CRC calculation circuit 35c, and receives the CRC value CRCW from the CRC calculation circuit 35c.

Furthermore, the packet assembling circuit 35f assembles a packet DATWR including the handle value HNDLW, the CRC value CRCW, an address, write data, the size of the write data, and the like and outputs the packet DATWR. The packet DATWR is an example of the data 13 through 15 indicated in FIG. 1. Write data written to a memory of the display device 22 include image data, the identification information indicated in FIG. 1, and the like. In the following description, the identification information is represented as a sequence number SEQNUM.

The packet assembling circuit 35f includes a sequence number controller 35f1 which assigns the sequence number SEQNUM to the packet DATWR and a buffer 35f2 which temporarily holds the assembled packet DATWR.

The sequence number controller 35f1 exercises control so as to assign different sequence numbers SEQNUM to data transmitted in succession. However, if the packet assembling circuit 35f receives the retransmission request REQRET, the sequence number SEQNUM assigned to the packet DATWR held in the buffer 35f2 is not changed. As a result, if the same data are retransmitted, the sequence number SEQNUM is the same.

Excluding a case where the information DATUMI includes a specific address or a specific command, there is no need for the packet assembling circuit 35f to assign a sequence number SEQNUM. The specific address is, for example, the address of the nonvolatile memory of the semiconductor memory 21 which stores application data (such as image data) used for application processing. Furthermore, the specific command is, for example, a command to instruct to perform a display process.

FIG. 7 illustrates an example of an assembled packet.

FIG. 7 illustrates an example of a packet DATWR of a memory write command (BlockWrite) standardized by EPCglobal.

First the packet DATWR includes "OpeCode" (11000111) which is 8-bit command information and which indicates a write command. Furthermore, the packet DATWR includes "MemBank" indicative of the address of a write destination bank and represented by two bits and "WordPtr" indicative of a write starting address. "WordPtr" is designated by extensible bit vectors (EBVS). In addition, the packet DATWR includes "WordCount" indicative of a write word count and represented by eight bits, "DataWrite" indicative of write data and represented by (word count×16) bits, "Handle" indicative of a handle value and represented by sixteen bits, and "CRC" indicative of a CRC value and represented by sixteen bits.

Furthermore, as illustrated in FIG. 7, write data regarding application processing include a sequence number SEQNUM, pointer information APPDIPTR, application data length APPLEN, and application data APPDAT. If application processing includes a display of image data, application data APPDAT are the image data and the like.

By generating the above packet DATWR, the reader-writer 20 transmits the sequence number SEQNUM and the like by the use of the memory write command standardized by EPCglobal.

The pointer information APPDIPTR determines timing at which data are read out from the display device 22. An example in which the pointer information APPDIPTR is applied will be described later.

(Example of Semiconductor Memory 21)

Figure 8:
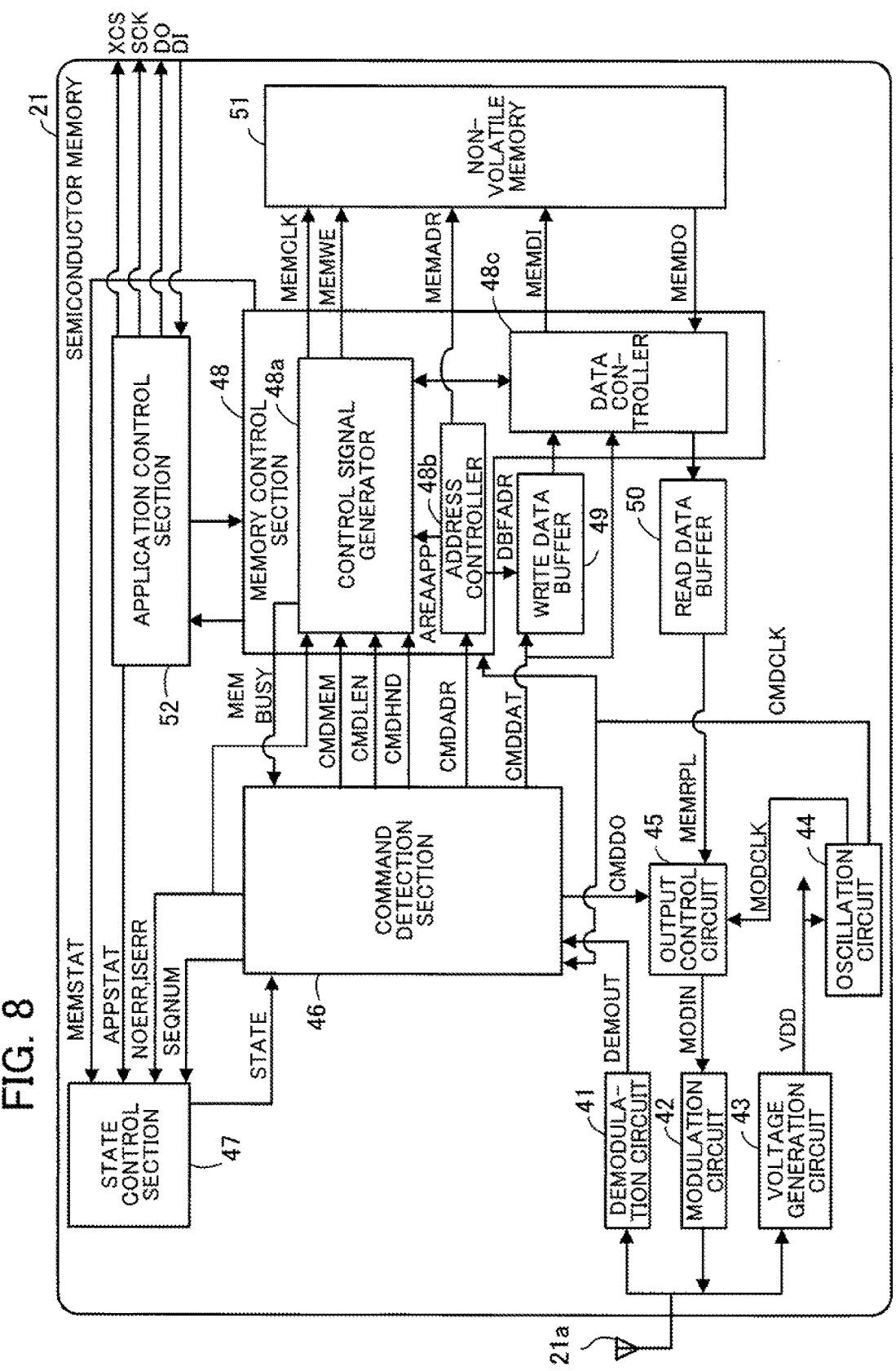
FIG. 8 illustrates an example of a semiconductor memory according to the second embodiment.

FIG. 8 illustrates an example of the semiconductor memory according to the second embodiment.

The semiconductor memory 21 includes a demodulation circuit 41, a modulation circuit 42, a voltage generation circuit 43, an oscillation circuit 44, an output control circuit 45, a command detection section 46, a state control section 47, and a memory control section 48. Furthermore, the semiconductor memory 21 includes a write data buffer 49, a read data buffer 50, a nonvolatile memory 51, and an application control section 52.

The demodulation circuit 41, the modulation circuit 42, the voltage generation circuit 43, the oscillation circuit 44, and the output control circuit 45 form an example of a circuit element group for realizing the function of the radio communication processor 11a included in the semiconductor memory 11 according to the first embodiment. The command detection section 46, the state control section 47, and the memory control section 48 form an example of a circuit element group for realizing the function of the controller 11c included in the semiconductor memory 11 according to the first embodiment.

The demodulation circuit 41 demodulates a radio signal received via the antenna 21a and outputs received data DEMOUT.

The modulation circuit 42 modulates reply data MODIN and supplies them to the antenna 21a.

The voltage generation circuit 43 generates an internal voltage VDD by rectifying the received radio signal.

On the basis of the internal voltage VOD, the oscillation circuit 44 a clock signal CMDCLK or a clock signal MODCLK. The clock signal CMDCLK is supplied to the command detection section 46 or the memory control section 48 and the clock signal MODCLK is supplied to the output control circuit 45.

The output control circuit 45 generates and outputs the reply data MODIN including response data CMDDO (such as a CRC value and a handle value) transmitted from the command detection section 46, read data MEMRPL read out from the read data buffer 50, and the like.

The internal voltage VDD is supplied not only to the oscillation circuit 44 but also to each section (not illustrated) of the semiconductor memory 21 which operates on the basis of the internal voltage VDD.

The command detection section 46 receives a state signal STATE, a signal MEMBUSY, or the received data DEMOUT and exercises command control on the basis of the state signal STATE, the signal MEMBUSY, or the received data DEMOUT. For example, the command detection section 46 receives as the received data DEMOUT the same packet as the packet DATWR illustrated in FIG. 7. The command detection section 46 detects the information included in the packet DATWR illustrated in FIG. 7 in the order of "OpeCode," "MemBank," "WordPtr," "Word-Count," "DataWrite," "Handle," and "CRC". Furthermore, the command detection section 46 outputs information CMDMEM indicative of the value of "OpeCode". In addition, the command detection section 46 outputs information CMDADR indicative of the values of "MemBank" and "WordPtr," information CMDLEN indicative of the value of "WordCount," and information CMDHND indicative of the value of "Handle". Moreover, the command detection section 46 outputs information CMDDAT indicative of the contents of "DataWrite".

If the signal MEMBUSY which indicates that the non-volatile memory 51 is in a busy state is asserted, then the command detection section 46 stops outputting the above information regarding the command.

Furthermore, if "DataWrite" includes a sequence number SEQNUM, then the command detection section 46 supplies the sequence number SEQNUM to the state control section 47.

In addition, the command detection section 46 calculates a CRC value by the use of the received data DEMOUT except "CRC". The command detection section 46 compares a CRC value included in the received data DEMOUT and the calculated CRC value to detect whether or not there is an error. If there is an error, then the command detection section 46 asserts a signal ISERR. If there is no error, then the command detection section 46 asserts a signal NOERR.

Furthermore, the command detection section 46 generates a CRC value by the use of response data including read data read out from the nonvolatile memory 51 and stored in the read data buffer 50, and outputs response data CMDDO including the CRC value (details are not illustrated).

On the basis of a signal MEMSTAT, a signal APPSTAT, the signal ISERR, the signal. NOERR, or the sequence number SEQNUM, the state control section 47 outputs the state signal STATE. The signal APPSTAT is outputted by the application control section 52 and indicates whether or not application processing based on received data is normally completed.

For example, the state control section 47 includes a register (not illustrated) which holds the sequence number SEQNUM and the value of the signal APPSTAT. The state control section 47 determines whether or not the sequence number SEQNUM of data received this time (received data DEMOUT) matches a sequence number SEQNUM held in the register of data received the last time. If they match, the state control section 47 determines on the basis of the value of the signal APPSTAT held in the register whether or not application processing based on the data received the last time normally ended. If the application processing based on the data received the last time normally ended, then the state control section 47 does not cause the command detection section 46 to output the information CMDMEM, the information CMDLEN, or the like and outputs the state signal STATE by which the state control section 47 causes the command detection section 46 to generate the response data CMDDO indicative of a normal response.

In addition, if the state control section 47 is informed by the signal MEMSTAT that reading out data from the non-volatile memory 51 ends, then the state control section 47 outputs the state signal STATE by which the state control section 47 causes the command detection section 46 to add a handle value and a CRC value as response data after the read data.

Moreover, for example, if the signal ISERR is asserted, then the state control section 47 outputs the state signal STATE by which the state control section 47 causes the command detection section 46 to generate the response data CMDDO indicative of an error response. If the signal NOERR is asserted, then the state control section 47 outputs the state signal STATE by which the state control section 47 causes the command detection section 46 to generate the response data CMDDO indicative of a normal response.

The memory control section 48 includes a control signal generator 48a, an address controller 48b, and a data controller 48c.

The control signal generator 48a receives the information CMDMEM, CMDLEN, or CMDHND, the signal NOERR, the signal ISERR, or a signal AREAAPP. On the basis of the information CMDMEM, CMDLEN, or CMDHND, or the signal NOERR, ISERR, or AREAAPP, the control signal generator 48a generates a control signal such as a write enable signal MEMWE or a clock signal MEMCLK. The signal AREAAPP is asserted when the address controller 48b determines that a command to the above specific address is received.

If the information CMDMEM indicates a write command and the information CMDHND indicates a handle value of the semiconductor memory 21, then the control signal generator 48a asserts the write enable signal MEMWE after an assertion of the signal NOERR. Furthermore, the control signal generator 48a outputs the clock signal MEMCLK. A process performed when the signal AREAAPP is asserted will be described later.

For example, while the write enable signal MEMWE is being asserted, the control signal generator 48a asserts the signal MEMBUSY which indicates that the nonvolatile memory 51 is in a busy state.

The address controller 48*b* receives the information CMDADR, generates a memory address MEMADR on the basis of the information CMDADR, and supplies the memory address MEMADR to the nonvolatile memory 51. Furthermore, when the address controller 48*b* determines from the information CMDADR that a command to a specific address is received, the address controller 48*b* asserts the signal AREAAPP to perform an application operation.

In addition, the address controller 48*b* has the function of designating an address DBFADR of the write data buffer 49.

The data controller 48*c* outputs data supplied from the write data buffer 49 as write data MEMDI at the time of writing to the nonvolatile memory 51. Furthermore, the data controller 48*c* supplies read data MEMDO to the read data buffer 50 under the control of the control signal generator 48*a* at the time of reading out from the nonvolatile memory 51.

In addition, the memory control section 48 transmits to or receives from the application control section 52 various pieces of information or image data. This will be described later.

The write data buffer 49 is a volatile storage circuit which temporarily stores the information CMDDAT.

The read data buffer 50 is a volatile storage circuit which temporarily stores the read data MEMDO read out by the data controller 48*c*.

The nonvolatile memory 51 is a flash memory, an EEPROM, an FeRAM, an MRAM, or the like.

On the basis of the various pieces of information or the image data received from the memory control section 48, the application control section 52 outputs a chip select signal, a clock signal, or data. The chip select signal, the clock signal, or the data are supplied to the display device 22 via a terminal XCS, SCK, or DO. Furthermore, the application control section 52 receives via a terminal DI data outputted by the display device 22.

In addition, the application control section 52 outputs the signal APPSTAT which indicates whether or not application processing based on received data is normally completed.

Figure 9:
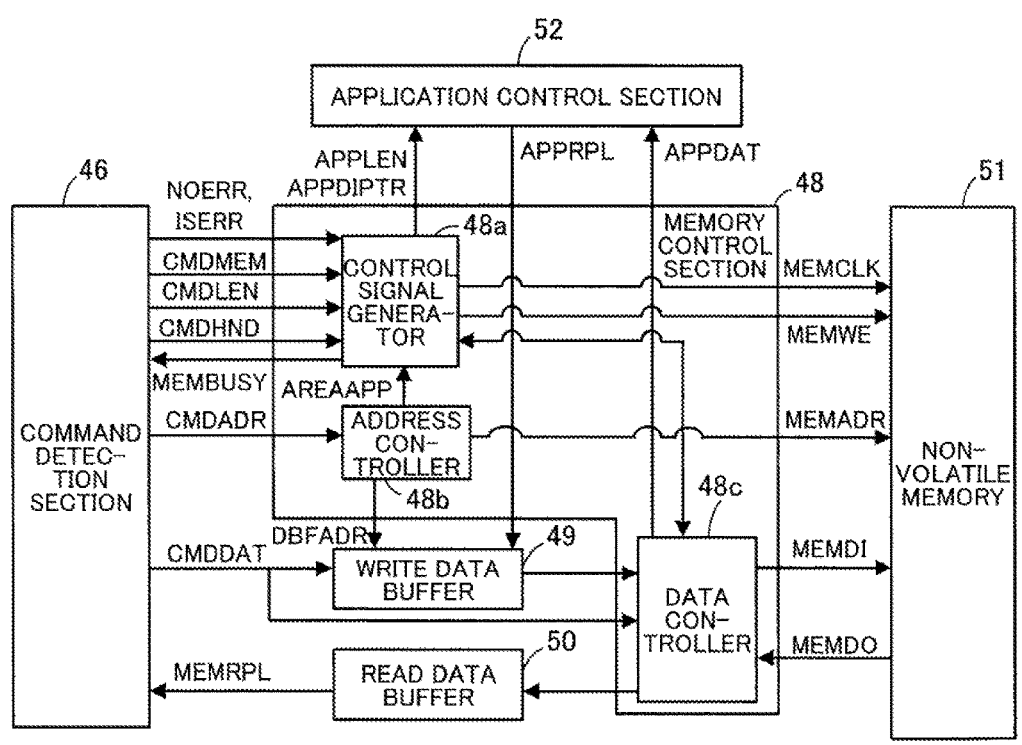
FIG. 9 is a view for describing data transmission and reception between a memory control section and an application control section.

FIG. 9 is a view for describing data transmission and reception between the memory control section and the application control section.

It is assumed that a command identified from the information CMDMEM is a command to supply data (such as image data or setting information) to the display device 22. When the signal AREAAPP is asserted, the control signal generator 48*a* outputs the application data length APPLEN. Furthermore, it is assumed that a command identified from the information CMDMEM is a command to read out data, such as a parameter, from the display device 22. The control signal generator 48*a* outputs the pointer information APPDIPTR which determines timing at which the data is read out from the display device 22.

The application data length APPLEN or the pointer information APPDIPTR is included in the information CMDDAT. For example, the application data length APPLEN or the pointer information APPDIPTR is written to the nonvolatile memory 51. After that the application data length APPLEN or the pointer information APPDIPTR is read out and used when the signal AREAAPP is asserted. In FIG. 9, a path along which the application data length APPLEN or the pointer information APPDIPTR is read out is not illustrated. The application data length APPLEN or the pointer information APPDIPTR may be extracted from the information CMDDAT before it is written to the nonvolatile memory 51.

If a command identified from the information CMDMEM is a command to cause the display device 22 to display an image, then the data controller 48*c* extracts from the read data MEMDO the application data APPDAT including image data. The data controller 48*c* then supplies the extracted application data APPDAT to the application control section 52.

Under the control of the control signal generator 48*a*, the data controller 48*c* does not write the information CMDDAT to the nonvolatile memory 51 but may supply the information CMDDAT to the application control section 52 as the application data APPDAT.

Figure 10:
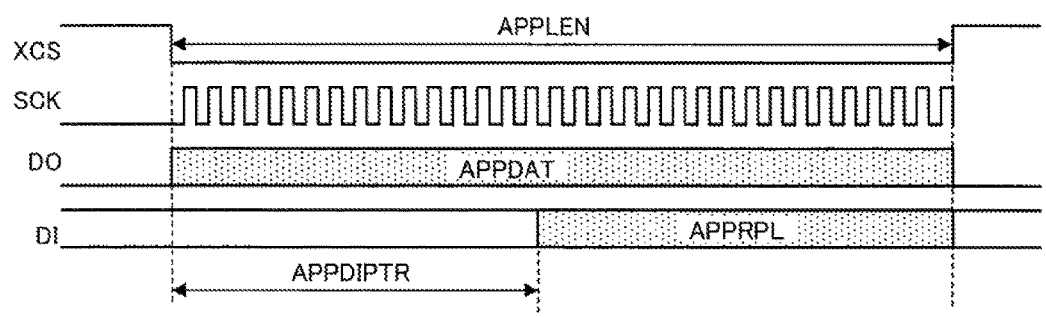
FIG. 10 is a timing chart illustrative of an example of a signal or data transmitted or received at application processing time between the application control section and a display device.

FIG. 10 is a timing chart illustrative of an example of a signal or data transmitted or received at application processing time between the application control section and the display device.

The logic level of the chip select signal supplied from the terminal XCS to the display device 22 is low (L) level for a period indicated by the application data length APPLEN. After that its logic level becomes a high (H) level. For the period for which the logic level of the chip select signal is the L level, the clock signal is supplied from the terminal SCK to the display device 22 and the application data APPDAT such as image data are supplied from the terminal DO to the display device 22.

Furthermore, in the example of FIG. 10, timing at which read data APPRPL are read out from the display device 22 is also indicated. The read data APPRPL are read out via the terminal DI after the elapse of a period indicated by the pointer information APPDIPTR from the time when the logic level of the chip select signal becomes the L level.

As illustrated in FIG. 9, for example, the read data APPRPL are supplied to the write data buffer 49 via the application control section 52. After that the read data APPRPL are written to the nonvolatile memory 51. The read data APPRPL may be supplied to the read data buffer 50 via the application control section 52 and then be transmitted to the reader-writer 20.

When the supply of the above application data APPDAT to the display device 22 normally ends, the application control section 52 informs the state control section 47 by the signal APPSTAT that application processing based on received data is normally completed.

At this time the state control section 47 outputs the state signal STATE by which the state control section 47 causes the command detection section 46 to generate the response data CMDDO indicative of a normal response. The command detection section 46 outputs the response data CMDDO indicative of a normal response. As a result, a normal response is given to the reader-writer 20.

If the reader-writer 20 does not normally receive the normal response because of a communication error which occurs by the influence of noise or the like, then the reader-writer 20 retransmits data to which the same sequence number SEQNUM is assigned.

In this case, the command detection section 46 of the semiconductor memory 21 supplies the sequence number SEQNUM included in "DataWrite" to the state control section 47. The state control section 47 detects that the sequence number SEQNUM supplied the last time matches the sequence number SEQNUM supplied this time and detects by the signal APPSTAT held in the register that application processing based on the data received the last time is normally completed. Accordingly, the state control section 47 does not cause the command detection section 46 to output information CMDMEM, CMDLEN, CMDHND, CMDADR, or CMDDAT, and outputs again a state signal STATE by which the state control section 47 causes the command detection section 46 to generate response data CMDDO indicative of a normal response.

If the sequence number SEQNUM supplied the last time is different from the sequence number SEQNUM supplied this time or if the application processing based on the data received the last time is not normally completed, then the state control section 47 outputs a state signal STATE by which the state control section 47 allows the command detection section 46 to output the above information. As a result, application processing in which the signals and data illustrated in FIG. 10 are supplied 26 from the application control section 52 to the display device 22 is performed again. A result (response indicative of whether or not the application processing is normally completed) is returned to the reader-writer 20.

As has been described, there is a case where the semiconductor memory 21 according to the second embodiment detects by sequence numbers SEQNUM that the same data are received in succession. If the data received the last time are normally processed, then the semiconductor memory 21 according to the second embodiment prevents the data received this time from being processed again. This suppresses the occurrence of abnormal operation such as an increase in the length of the image illustrated in FIG. 3.

An example in which the display device 22 is used as an external device connected to the semiconductor memory 21 has been described. However, an external device connected to the semiconductor memory 21 is not limited to a display device and may be a sensor or the like.

An aspect of a semiconductor memory having a radio communication function and an application control method according to the present disclosure has been described on the basis of the embodiments. However, these are simple examples and the present disclosure is not limited to the above description.

According to an aspect, the present disclosure suppresses the occurrence of abnormal operation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A semiconductor memory having a radio communication function, the semiconductor memory comprising:
   a radio communication processor that receives first data to which identification information is assigned and that transmits a response signal indicative of whether or not application processing based on the first data is normally performed;
   a first controller that controls the application processing based on the first data and that detects whether or not the application processing is normally performed; and
   a second controller that detects, based on the identification information whether or not the radio communication processor receives the first data in succession due to retransmission caused by a communication error, and that nullifies, when the radio communication processor receives the first data in succession and the first controller detects that the application processing based on the first data received earlier is normally performed, control of the application processing based on the first data received later to be performed by the first controller and instructs the radio communication processor to transmit the response signal which indicates that the application processing is normally performed.

2. The semiconductor memory according to claim 1, further comprising a nonvolatile memory,
   wherein:
   the first data includes command information indicative of a write command, write data, and an address of the nonvolatile memory indicative of a write destination of the write data; and
   the write data includes the identification information, application data used for the application processing, and a data length of the application data.

3. The semiconductor memory according to claim 2, wherein:
   when the address is a first address of the nonvolatile memory determined in advance, the second controller extracts the application data from the first data and supplies the application data to the first controller; and
   when the address is a second address different from the first address, the second controller writes the first data to the second address of the nonvolatile memory.

4. The semiconductor memory according to claim 1, wherein:
   the identification information is a 1-bit value; and
   different 1-bit values are assigned to the first data and second data that is received next to the first data by the radio communication processor and different from the first data.

5. The semiconductor memory according to claim 1, wherein the radio communication processor generates from a radio signal including the first data an internal voltage which causes the first controller and the second controller to operate.

6. An application control method comprising:
   receiving, by a radio communication processor, first data to which identification information is assigned and transmitting, by the radio communication processor, a response signal indicative of whether or not application processing based on the first data is normally performed;
   controlling, by a first controller, the application processing based on the first data and detecting, by the first controller, whether or not the application processing is normally performed; and
   detecting, by a second controller, based on the identification information whether or not the radio communication processor receives the first data in succession due to retransmission caused by a communication error, and nullifying, by the second controller when the radio communication processor receives the first data in succession and the first controller detects that the application processing based on the first data received earlier is normally performed, control of the application processing based on the first data received later to be performed by the first controller and instructing, by the second controller, the radio communication processor to transmit the response signal which indicates that the application processing is normally performed.

7. The application control method according to claim 6, wherein:
the first data includes command information indicative of a write command, write data, and an address of a nonvolatile memory indicative of a write destination of the write data; and
the write data includes the identification information, application data used for the application processing, and a data length of the application data.

8. The application control method according to claim 7, wherein:
when the address is a first address of the nonvolatile memory determined in advance, the second controller extracts the application data from the first data and supplies the application data to the first controller; and
when the address is a second address different from the first address, the second controller writes the first data to the second address of the nonvolatile memory.

9. The application control method according to claim 6, wherein:
the identification information is a 1-bit value; and
different 1-bit values are assigned to the first data and second data received next to the first data by the radio communication processor and different from the first data.

10. The application control method according to claim 6, wherein the radio communication processor generates from a radio signal including the first data an internal voltage which causes the first controller and the second controller to operate.

11. A radio communication system comprising:
a semiconductor memory including:
a radio communication processor that receives first data to which identification information is assigned and that transmits a response signal indicative of whether or not application processing based on the first data is normally performed;
a first controller that controls the application processing based on the first data and that detects whether or not the application processing is normally performed; and
a second controller that detects, based on the identification information whether or not the radio communication processor receives the first data in succession due to retransmission caused by a communication error, and that nullifies, when the radio communication processor receives the first data in succession and the first controller detects that the application processing based on the first data received earlier is normally performed, control of the application processing based on the first data received later to be performed by the first controller and instructs the radio communication processor to transmit the response signal which indicates that the application processing is normally performed; and
a reader-writer that transmits the first data to the semiconductor memory.

12. The radio communication system according to claim 11, wherein the reader-writer generates the first data including write data including the identification information, application data used for the application processing, and a data length of the application data, command information indicative of a write command, and an address of a nonvolatile memory of the semiconductor memory indicative of a write destination of the write data.

13. The radio communication system according to claim 11, wherein the reader-writer assigns, when retransmitting the first data, the same identification information as the first data transmitted earlier to the first data to be retransmitted.

14. The radio communication system according to claim 11, wherein the reader-writer assigns different 1-bit values as the identification information to the first data and second data that is transmitted next to the first data and different from the first data.

* * * * *